June 12, 1956 F. G. BRAHAM 2,750,524

PERFORATE MASK FOR MULTICOLOR TELEVISION APPARATUS AND METHOD OF PRODUCING SAME

Filed Nov. 15, 1951 2 Sheets-Sheet 1

Developed Work Piece

Finished Aperture Mask

Hole Pattern

INVENTOR
Frank G. Braham

By Morrison, Kennedy & Campbell ATTORNEYS

June 12, 1956 F. G. BRAHAM 2,750,524

PERFORATE MASK FOR MULTICOLOR TELEVISION APPARATUS AND METHOD OF PRODUCING SAME

Filed Nov. 15, 1951 2 Sheets-Sheet 2

INVENTOR
Frank G. Braham

By Morrison Kennedy Campbell ATTORNEYS

United States Patent Office 2,750,524

Patented June 12, 1956

2,750,524

PERFORATE MASK FOR MULTICOLOR TELEVISION APPARATUS AND METHOD OF PRODUCING SAME

Frank G. Braham, Merrick, N. Y., assignor to Mergenthaler Linotype Company, a corporation of New York Application November 15, 1951, Serial No. 256,523

4 Claims. (Cl. 313—86)

This invention is directed to an improved perforate mask for multicolor television apparatus (as distinguished from the present monochrome system) and also to the method of forming the apertures or perforations therein. These apertures are extremely small (approximately .009" in diameter) and, except for a plain and relatively narrow border section, are disposed in multiple pattern form over the entire area of the mask, the latter in turn being blocked to shape in a workpiece, of sheet copper alloy .004" in thickness, which supports the mask for convenient handling during the processing period. The apertures in the improved mask are located in a plane between and parallel with the opposite side faces thereof and are formed respectively by the intersection of two accurately centered recesses produced by separate etching operations in the opposite side faces of the mask. The improved mask is particularly useful for cathode-ray tubes of the so-called "masked-target" variety, such as shown and described in the Law Patent 2,625,734, dated January 20, 1953.

According to the present invention, the recesses produced by the first etching operation, which is performed from the inner side face of the mask, are semi-spherical in form and sufficiently deep to completely penetrate the mask, while the recesses produced by the second etching operation, which is performed from the outer side face of the mask (that opposed to the screen of the television apparatus), are substantially semi-conical in form and exceptionally shallow. These two etching operations are so timed as to insure absolute precision not only in the size of the orifice-like apertures in the perforate mask but also in the depth of the recesses centered therewith. Consequently, when the finished mask is in use, any perceptible distortion of the electronic beam, in passing through such apertures at the different required angles, is avoided and a color television having a good picture texture and adequate apparent definition is assured.

The improved mask and the different steps in the method employed for producing the apertures therein will best be understood from the detailed description to follow.

Referring to the drawings.

Figure 1:
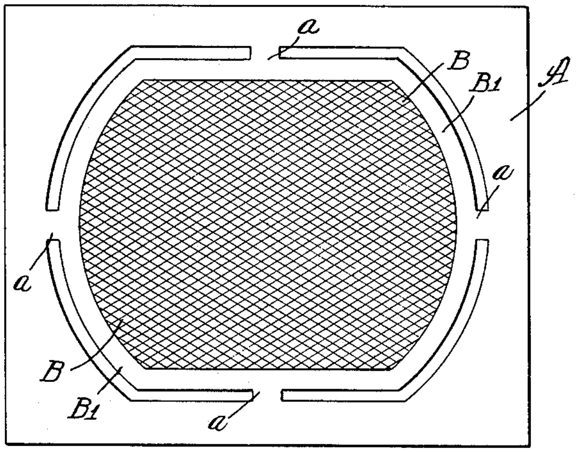
Fig. 1 is a front view, partially diagrammatic, of the developed workpiece for the improved mask.
Figure 2:
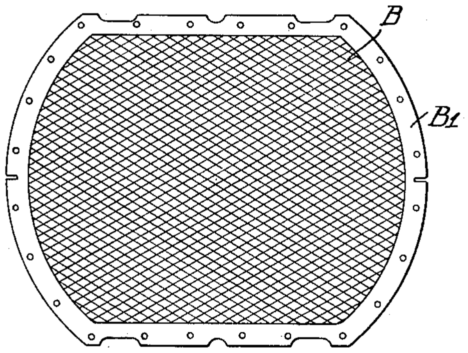
Fig. 2 is a similar view of the finished perforate or so-called "aperture" mask.
Figure 3:
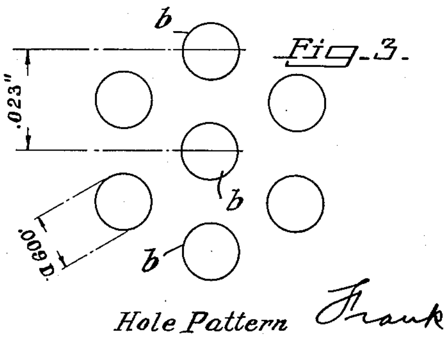
Fig. 3 is a diagram to show the pattern used for locating the apertures in their proper relation to one another on the mask.

The workpiece A for the perforate mask B (Fig. 1) is cut to length (14 inches) from tough sheet metal roll stock .004" in thickness and processed in such manner as to provide a blank portion of the exact shape and size for the mask, the blank portion being adequately supported for separate processing in the workpiece by filaments of metal *a* spaced apart around the perimeter of the mask. The apertures *b* of the mask B are circular in form and are disposed in multiple pattern form, such as that shown schematically in Fig. 3, over the entire area of the mask, except for a relatively narrow border $B^1$.

Figure 10:
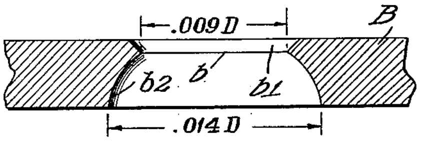
Fig. 10 is a detail vertical section similar to Fig. 9 showing a portion of the finished mask after the developed coating has been removed therefrom.

For the reasons hereinbefore mentioned and according to the present invention, the apertures *b* of the mask B (Fig. 10) are knife-edged and disposed in a plane immediately adjacent to the outer side face thereof, being formed at the bottom of exceptionally shallow, semi-conical recesses $b^1$ produced from the outer side face of the mask and which intersect much larger semi-spherical recesses $b^2$ produced from the inner side face of the mask. In order that the mask B may serve its purpose in the manner required, the apertures *b* must be clearly defined and uniform in shape and size throughout the perforate area they occupy; and to bring about this condition, photographic as well as subsequent etching procedures are proposed which will be economical and also well suited to large scale commercial production.

To the foregoing end, a coating $a^1$ of dichromated light sensitive emulsion first is applied to one side face of the workpiece A while it is being rotated on a spinner device (not shown) in a plane disposed at a 15° angle from the vertical; next, the workpiece A is tilted past the vertical through 30° on said device so as to rotate at a similar 15° angle, while the emulsion coating $a^1$ is applied to the other side face thereof; and finally the workpiece is tilted in the opposite direction through 15° so that it may be rotated in a vertical plane until the emulsion coatings are properly dried.

Figure 4:
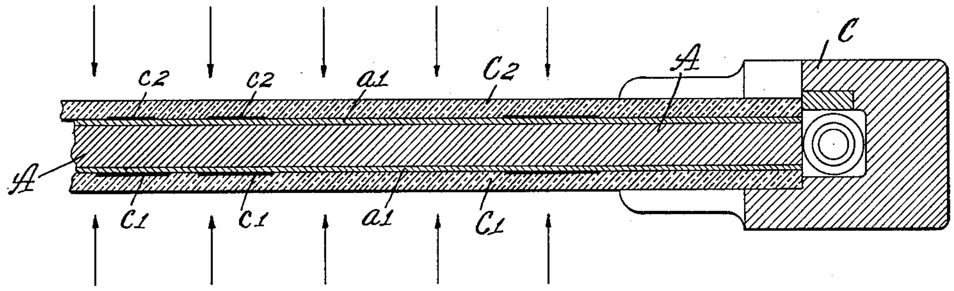
Fig. 4 is a vertical schematic section showing a portion of the coated workpiece, on a greatly enlarged scale, positioned in a vacuum frame between the two master plates before it is exposed.

The vacuum frame C employed, and partly shown more or less schematically in Fig. 4, is equipped with two rectangular transparent plates $C^1$ and $C^2$ which fit snugly against the inner walls of said frame, the plate $C^1$ being permanently mounted therein while the plate $C^2$ is capable of removal therefrom when desired. These master plates $C^1$ and $C^2$ are provided respectively on their inner or opposed surfaces with a multiplicity of opaque circular markings $c^1$ and $c^2$ adapted, when the coated workpiece A is positioned between the plates and thereafter exposed to light, to produce corresponding latent images in the coatings $a^1$ which cover the opposite side faces of the mask portion of the workpiece. When the workpiece A is developed, the images thus produced in the coatings $a^1$ during the exposure will in turn reproduce the pattern for the apertures $b$ later to be etched in the mask B.

For a better understanding of the general procedure during the photographic stage and assuming the vacuum frame C to be supported in a horizontal position upon a bench or table for convenient access to the parts, the upper transparent plate $C^2$ first is removed from the frame C and the coated workpiece A placed upon the stationary transparent plate $C^1$ with the blank portion for the mask B properly positioned upon the area occupied by the opaque markings $c^1$ thereon. The master plate $C^2$ then is accurately located upon the workpiece A so that its opaque markings $c^2$ will be centered with those on the plate $C^1$, and air between them is exhausted by a vacuum pump (not shown) to insure proper contact between the parts. The workpiece A now is ready for a 4 to 6 minute exposure which takes place while the vacuum frame is supported in a vertical position from an overhead track, whereon a number of similarly loaded vacuum frames may be accommodated and successively passed through an appropriate exposure compartment. Here the workpiece A is subjected to the rays of twin arc lamps of the proper amperage and disposed respectively on opposite sides of the vacuum frame C at a predetermined distance therefrom. After the exposure and the workpiece has been removed from the vacuum frame and developed in water, it is baked in a temperature of, say, 500° F., for 6 minutes to harden the coatings $a^1$ on both the outer and the inner surfaces thereof including, of course, the blank portion for the mask B.

Figure 5:
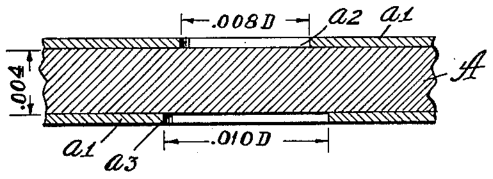
Fig. 5 is a detail vertical section showing, on a still larger scale, a portion of the coated workpiece after it is developed.
Figure 6:
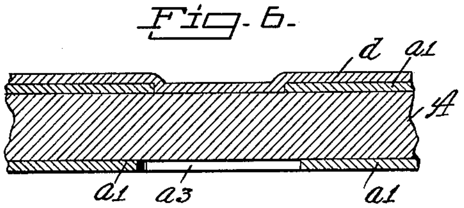
Fig. 6 is a detail vertical section similar to Fig. 5 but showing the acid resist coat applied to the outer side face of the developed workpiece preparatory to the first etching operation.
Figure 7:
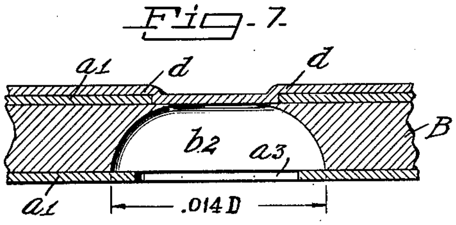
Fig. 7 is a detail vertical section similar to Figs. 5 and 6 showing one of the recesses produced in the mask by the first etching operation performed from the inner side face thereof.
Figure 8:
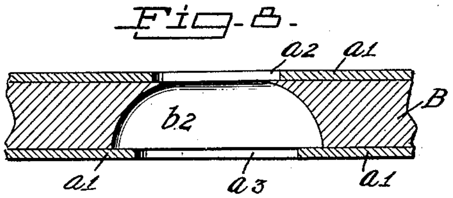
Fig. 8 is a detail vertical section similar to Fig. 7 showing a portion of the developed mask after the acid resist coat has been removed therefrom.
Figure 9:
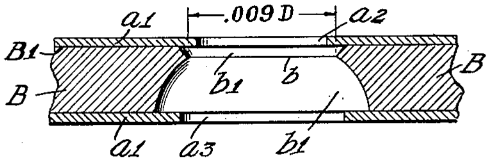
Fig. 9 is a detail vertical section similar to Fig. 8 showing one of the apertures produced in the mask by the second etching operation performed from the outer side face of the mask.

Then and preparatory to the first etching operation, the outer side face of the blank portion of the workpiece A (Fig. 6) is provided with an acid resist coat $d$ of bituminoid varnish to cover and protect temporarily the portions of metal exposed during the developing operations. In this connection, it may be stated, and as clearly indicated in Fig. 5, that the photo-printed openings $a^2$ produced in the emulsion coating $a^1$ on the outer side face of the blank from the markings $c^2$ on the master plate $C^2$ are preferably .008″ in diameter or, as shown in Fig. 9, .001″ less than the ultimate or final size of the apertures to be produced in the mask B. It also may be observed (Fig. 5) that the photo-printed openings $a^3$ produced in the emulsion coating $a^1$ on the inner side face of the blank from the markings $c^1$ on the master plate $C^1$ are .010″ in diameter or, as shown in Fig. 7, .004″ less than the diameter of semi-spherical recesses $b^2$ to be produced in the mask B by the first etching operation.

The etching setup for quantity or large scale commercial production will include a number of V-shaped etching troughs (not shown), about 12 ft. long, 2 ft. wide and 12 in. deep, spaced apart and arranged in groups of three, two groups for each working unit. The individual troughs will be equipped with means for conveying the etching frames for the workpieces A back and forth from one end of a trough to the other, the frames in their course of travel being sustained in an inclined position by the respective side walls of the trough so that the two side faces of a workpiece to be etched will pass through jets of etching fluid, which are directed against them by closely regulated pneumatic pressure. As an etching frame completes its initial lap or "pass" through a trough, it first is inverted and then shifted to the other side of the trough before it starts its return "pass" therethrough, so that any tendency to etch unevenly due to the influence of gravity upon the etching fluid is avoided.

It has been found that four "passes" or laps provided by the use of two adjacent troughs for a period of time not exceeding 16 minutes is sufficient to complete the first etching operation or the one which is adapted to produce the relatively deep recesses $b^2$ in the inner side face of the mask portion of the workpiece. In performing the second etching operation, however, and after the acid resist coat $d$ has been removed by a suitable solvent from the workpiece, it also has been found that only two "passes" effected in the same way through the third trough of a group and with the outer side face of the workpiece opposed to the jets of the etching fluid will suffice to accurately produce the apertures $b$ (Fig. 9) as well as the shallow semi-conical recesses $b^1$ in the mask portion of the workpiece. This comparatively short second etching period is due primarily to the fact that the semi-spherical recesses $b^2$ (as may be noted in Fig. 7) are etched sufficiently deep to penetrate the outer side face of the mask B in order to reduce to a minimum the amount of metal to be removed by the second etching operation. Consequently, the apertures $b$, by correct timing, may readily be brought to the exact size demanded and also will be located advantageously, for the reasons before stated, in a plane parallel with and immediately adjacent to the outer side face of the mask B. Finally, the workpiece A is submerged in a hot caustic bath adapted to dissolve the developed and hardened emulsion coatings $a^1$, and the now perforate portion thereof for the mask B may be completely removed from the workpiece by severing the retaining filaments of metal $a$.

Figure 11:
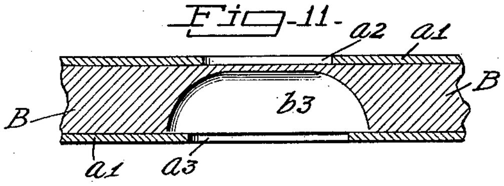
Fig. 11 is a detail vertical section similar to Fig. 8 but showing a recess of decreased depth which may be produced by the first etching operation performed from the inner side face of the mask.
Figure 12:
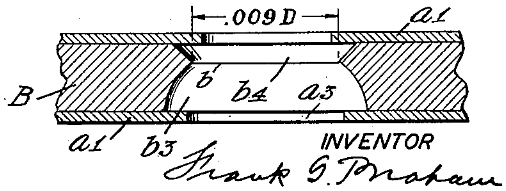
Fig. 12 is a detail vertical section showing one of the apertures produced by the second etching operation performed from the outer side face of the mask shown in Fig. 11.

If desired, the time required in etching the recesses in the inner surface of the workpiece A may be shortened sufficiently to produce recesses $b^3$, such as the one shown in Fig. 11, which do not break through the outer surface of the blank for the mask B. In this way, the necessity for an acid resist could be eliminated and recesses $b^4$ (Fig. 12) slightly deeper than the recesses $b^1$ then would be produced in the outer side face of the mask B by the second etching operation. By accurately timing the first etching operation, the depth of the recesses $b^1$ might be such that they will only slightly penetrate the outer face of the mask B and in this way also dispense with the need for the protective coat of acid resist $d$ as well as lessen the difficulties of inspection prior to the second etching operation. These and other variations in the method of producing the apertures $b$ will readily suggest themselves to those skilled in the art without departing from the scope of the present invention, as defined in the appended claims.

What is claimed is:

1. In or for a multicolor television apparatus, a sheet metal perforate mask wherein the individual apertures are disposed in a plane immediately adjacent to and parallel with the outer face of the mask, said plane being located nearer to the outer face of the mask than to the mid-plane thereof, and said apertures being formed at the bottom of exceptionally shallow semi-conical recesses produced in the outer side face of the mask.

2. In or for a multicolor television apparatus, a sheet metal perforate mask wherein each individual aperture is formed by the intersection of an exceptionally shallow semi-conical recess produced in the outer side face of the mask, with a much deeper semi-spherical recess produced from the inner side face of the mask and which penetrates the outer side face thereof.

3. In or for a multicolor television apparatus, a sheet metal perforate mask wherein each individual aperture is formed by the intersection of two recesses in a plane parallel to and immediately adjacent the outer side face of the mask, the recess produced in one side face of the mask being semi-conical in shape and that produced in the other side face thereof being semi-spherical in shape.

4. The perforate mask according to claim 3, wherein the semi-conical recess produced in the outer side face of the mask is shallow, while the semi-spherical recess produced in the inner side face of the mask is sufficiently deep to penetrate the outer side face thereof.

(References on following page)

References Cited in the file of this patent

UNITED STATES PATENTS

| | | |
|---|---|---|
| 2,171,276 | Norris | Aug. 29, 1939 |
| 2,186,636 | Gorlich | Jan. 9, 1940 |
| 2,267,752 | Ruska et al. | Dec. 30, 1941 |
| 2,536,383 | Mears et al. | Jan. 2, 1951 |
| 2,547,638 | Gardner | Apr. 3, 1951 |
| 2,581,487 | Jenny | Jan. 8, 1952 |
| 2,619,608 | Rajchman | Nov. 25, 1952 |
| 2,625,734 | Law | Jan. 20, 1953 |
| 2,663,821 | Law | Dec. 22, 1953 |